Nov. 16, 1926.

J. U. BEATTY 1,607,504

DIRIGIBLE HEADLIGHT MECHANISM FOR AUTOMOBILES

Filed Oct. 3, 1924   2 Sheets-Sheet 1

J. U. Beatty
INVENTOR

BY Victor J. Evans.
ATTORNEY

WITNESS:

Nov. 16, 1926.

J. U. BEATTY 1,607,504

DIRIGIBLE HEADLIGHT MECHANISM FOR AUTOMOBILES

Filed Oct. 3, 1924   2 Sheets-Sheet 2

J. U. Beatty
INVENTOR

BY Victor J. Evans
ATTORNEY

WITNESS:

Patented Nov. 16, 1926.

1,607,504

UNITED STATES PATENT OFFICE.

JAMES U. BEATTY, OF ATKINS, VIRGINIA, ASSIGNOR OF ONE-HALF TO HERMAN HANSON, OF ATKINS, VIRGINIA.

DIRIGIBLE-HEADLIGHT MECHANISM FOR AUTOMOBILES.

Application filed October 3, 1924. Serial No. 741,486.

The object of my said invention is the provision of improved means for turning automobile headlights in the direction in which an automobile is turned incident to steering of the latter, and this without liability of casual turning of the headlights or lamps and without liability of the same shaking under the vibration usually present when an automobile is running.

Other objects and practical advantages of the invention will be fully understood from the following description and claim when the same is read in connection with the drawings, accompanying and forming part of this specification, in which:—

Similar numerals of reference designate corresponding parts in all of the views of the drawings.

Figure 1:
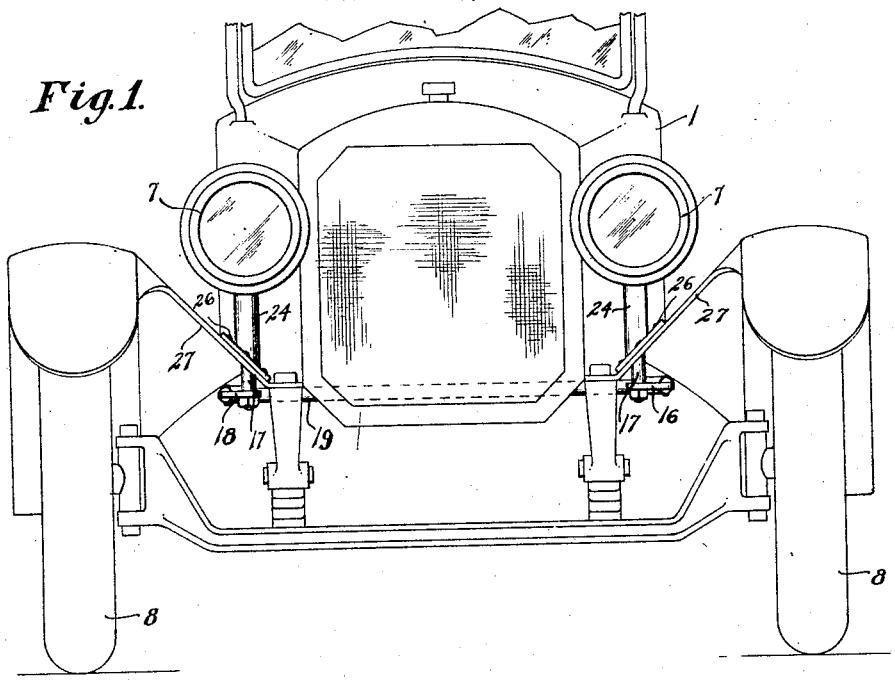
Figure 1 is a front elevation showing a portion of an automobile equipped with the preferred embodiment of my invention.
Figure 2:
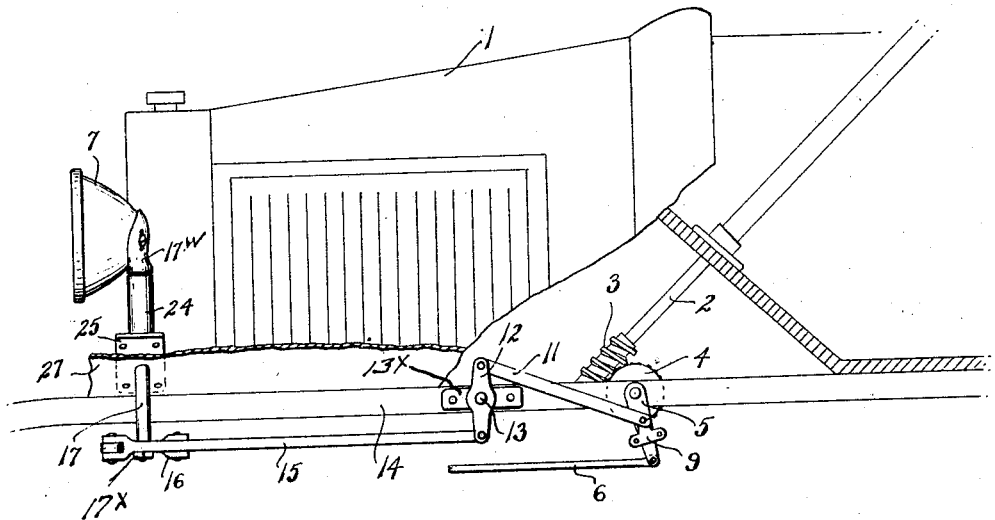
Figure 2 shows a portion of the automobile partly in side elevation and partly in section and also shows the arrangement of my improvement.
Figure 3:
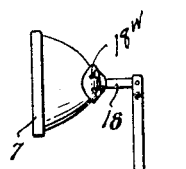
Figure 3 is a top plan view showing a portion of my improvement in plan.
Figure 3:
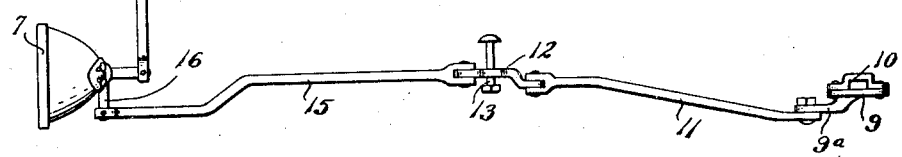

The automobile 1 is provided with a steering shaft 2 on which is a worm 3 meshed with a worm gear 4 that is fixed to a crank 5, and is otherwise by preference of the ordinary well known construction, the crank 5 being connected through a pitman 6 with the steering mechanism of the automobile in the ordinary manner or in any other manner compatible with the purpose of my invention, it being understood in this connection that my improvement derives motion from the crank 5 so that the horizontal swinging movements of the lamps 7 will be in concert with the shifting of the front wheels 8 for the guidance of the automobile so that the path in front of the automobile will be adequately illuminated irrespective of the turn that the automobile is to make.

In accordance with my invention a bracket 9 is secured by a clip 10 on the said crank 5 and pivoted to the bracket 9 or rather to an arm $9^a$ thereon is a link 11 which, in turn, is pivotally connected to the upper arm of a lever 12 pivotally mounted on a pin 13 carried by a plate $13^x$, fixed to an appropriate portion 14 of the automobile. The lower arm of the said lever 12 is connected by a link 15 with a horizontally swinging bell crank 16 having a taper aperture $16^x$ and secured by a nut $17^x$ on the taper portion $18^x$ of an upright rock shaft 17. The construction just described permits of ready adjustment of the lamps in line with the car, and the opposed surfaces of the crank 16 and taper $18^x$ are preferably ground to prevent casual movement. The said rock shaft 17 has adjustably fixed on a head at its upper end the adjacent lamp 7, and the other lamp 7 is carried by rock shaft 18 similar to the first-named shaft 17 and provided at its lower end with an arm 18 connected through the medium of a cross bar 19 with the rearwardly disposed arm of the bell crank 16. The arm 18 is connected to the adjacent rock shaft 17 in the same manner that the bell crank 16 is connected to its rock shaft. From this it follows that rocking of the bell crank 16 will be attended by turning of the rock shafts 17 about their axes in a common direction. The heads connected to the rock shafts 17 and to which the lamps 7 are fixed are designated by $17^w$, and by reference to Figure 4 it will be noticed that the said heads surmount and are adapted to turn against ball bearings 20; and it will also be noticed that each rock shaft 17 is provided with an enlargement 21 that rests on ball bearings 22 supported by nuts 23 threaded in the lower portions of hollow uprights 24, the said hollow uprights which are preferably of circular cross-section being provided at their lower ends with flanges 25 fixed at 26, Figure 1, on the fender arms 27 of the automobile. Slots $18^w$ are provided in the heads $17^w$ for adjustment of the lamps 7.

Figure 4:
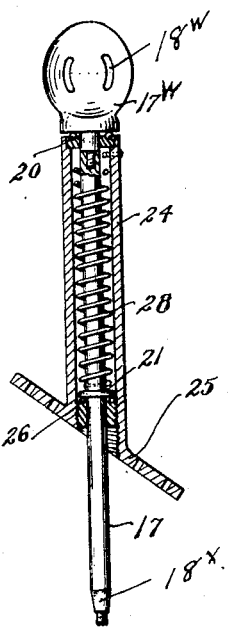
Figure 4 is an enlarged vertical section showing the means for preventing casual turning or shaking of one lamp or headlight.
Figure 5:
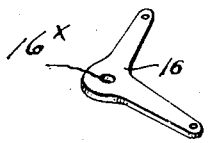
Figure 5 is a perspective of the bell crank comprised in my improvement.
Figure 6:
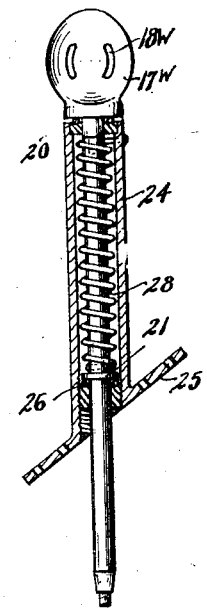
Figure 6 is a view similar to Figure 4 showing the means for preventing casual turning or shaking of the other lamp or headlight, the springs in Figures 4 and 6 being reversely arranged—i. e., one being a right hand spring and the other a left hand spring.

For the important purpose of preventing causal movement of the lamps 7 and for preventing rattling of the lamps 7, I provide in conjunction with the rock shaft 17 of each lamp a spring 28 such as shown in Figures 4 and 6, the said spring being coiled about the shaft 17 and connected at one end to the upright 24 and at its opposite end to the shaft 17, to normally maintain the lamp 7 in straight ahead position as shown in Figure 1, and that when the lamp 7 is turned in either direction the spring 28 will be put under tension and will tend to return the lamp to normal position. One of the said springs 28 is a right hand spring and the other is a left hand spring so that the said springs will act against each other in performing the functions ascribed to them.

In the practical use of my improvement it will be manifest that the turning of the lamps 7 will assuredly attend the swinging of the wheels 8 in the manner and for the purpose indicated.

I have specifically described the construction and relative arrangement of parts in the preferred embodiment of my invention in order to impart an exact understanding of said embodiment. I do not desire, however, to be understood as confining myself to such specific construction and relative arrangements of parts, my invention being defined by my appended claim within the scope of which changes may be made without departure from my invention.

Having described my invention, what I claim and desire to secure by Letters-Patent, is:—

In a device of the character described, spaced hollow upright posts, annular flanges at one end of said posts disposed at an angle relative to the body of the posts, rock shafts extending upwardly through the posts, an arcuate shaped head at the upper end of each rock shaft each formed with a pair of curved slots, means for adjustably attaching a head light to each of said plates, ball bearings at the upper ends of said hollow uprights for supporting the lamp plates, nuts threaded into the hollow uprights and supporting ball bearings, and an annular enlargement on each of said rock shafts resting upon the last mentioned ball bearings and means having connection with the lower end of said rock shafts for imparting rotative movement thereto in one direction and coil springs surrounding the hollow shafts within said hollow uprights as and for the purpose set forth.

In testimony whereof I affix my signature.

JAMES U. BEATTY.